(12) United States Patent
Gardner et al.

(10) Patent No.: US 7,227,289 B2
(45) Date of Patent: Jun. 5, 2007

(54) UNIFIED ASSEMBLY FOR SLOT CELL INSULATION

(75) Inventors: William C Gardner, Rock Hill, SC (US); Phillip Keaton, Rock Hill, SC (US)

(73) Assignee: Siemens Power Generation, Inc., Orlando, FL (US)

( * ) Notice: Subject to any disclaimer, the term of this patent is extended or adjusted under 35 U.S.C. 154(b) by 257 days.

(21) Appl. No.: 11/007,504

(22) Filed: Dec. 8, 2004

(65) Prior Publication Data

US 2006/0119208 A1  Jun. 8, 2006

(51) Int. Cl.
*H02K 3/34* (2006.01)
(52) U.S. Cl. .................................... 310/215
(58) Field of Classification Search ............. 310/214, 310/215, 261
See application file for complete search history.

(56) References Cited

U.S. PATENT DOCUMENTS

| | | | | |
|---|---|---|---|---|
| 4,508,985 A | * | 4/1985 | Pavlik et al. ............... | 310/55 |
| 5,421,077 A | * | 6/1995 | Zayechek et al. ........... | 29/598 |
| 6,483,211 B2 | * | 11/2002 | Rink, Jr. .................... | 310/63 |
| 6,501,201 B1 | * | 12/2002 | Whitener et al. ........... | 310/71 |
| 2006/0119208 A1 | * | 6/2006 | Gardner et al. ............. | 310/215 |

OTHER PUBLICATIONS

"Turbine Generator Rotor Turn Insulation", Weddleton et al. Conference Record of the 1992 IEEE International Symposium on Electrical Insulation, Jun. 7-10, 1992.*

* cited by examiner

*Primary Examiner*—Karl Tamai

(57) ABSTRACT

The present invention facilitates keeping the slot cells 8 of a generator rotor from migrating during operation of the rotor. The present invention utilizes a slot cell catch 10 that hold slot cells 8, both U-shaped and L-shaped, in position within a rotor body slot 6. The catch 10 limits movement to a pre-determined amount, usually only a fraction of an inch. The catch can withstand the forces of rotor in operation, and the limitation in migration reduces the need for inspection on the slot cells 8 as well as lowering the risk of grounds being created between the windings and the rotor body

19 Claims, 2 Drawing Sheets

UNIFIED ASSEMBLY FOR SLOT CELL INSULATION

FIELD OF THE INVENTION

The field of the invention relates to generator windings, and more specifically to slot cell insulation.

BACKGROUND

Within a generator rotor, windings need to be electrically insulated from the rotor body. This is accomplished by lining the slots into which the windings are placed with insulation. The insulation is referred to as slot cells and they essentially form a receptacle within a rotor body slot where the windings are placed.

FIG. 1 illustrates a close up view of windings 2 within a slot 4 of a rotor body 6. The rotor body 6 has a series of radial/axial slots 4 into which the windings 2 are placed. The slot cell 8 insulation is placed along the length of the slots 4 and it axially extends from the end of the slot about 1.5 inches (3.75 cm). This is because the slot cells can slide, also referred to as migrate, during operation of the rotor. If the windings 2 come into direct contact with the rotor body 6 a ground path is created which causes considerable damage to the generator core.

The slot cells are typically either of a single U-shaped piece or two L-shaped pieces. The additional extension of the slot cells to either end of the rotor body slots allows for some migration of the slot cells during operation. However, the migration of the slots cells still has to be closely monitored and the risk of creating a ground through contact of the windings with the rotor body is always present.

What is needed is a method and apparatus that prevents migration of the slot cells without interfering with the normal function of a generator rotor.

SUMMARY OF THE INVENTION

With the foregoing in mind, methods and apparatuses consistent with the present invention, which inter alia facilitates keeping the slot cells of a generator rotor from migrating during operation of the rotor. The present invention utilizes a slot cell catch that holds slot cells, both U-shaped and L-shaped, in position within a rotor body slot. The catch limits movement to a pre-determined amount, usually only a fraction of an inch. The catch can withstand the forces of rotor in operation, and the limitation in migration reduces the need for inspection of the slot cells as well as lowering the risk of grounds being created between the windings and the rotor body.

The slot cell catch is an elongated strip of material that is placed along the flat length of the slot cell where the windings are to be placed. The elongated strip is slightly longer than the slot cell that it accompanies, and will overlap the slot cell at both ends. The elongated strip then wraps around the ends of the slot cell, either as a contiguous strip or with prosthetic clips at either end. The clips then provide abutments against the rotor body, limiting the migration of the slot cells.

This strip of material can be as wide as the flat length of the slot cells, which is approximately the width of the rotor body slot, or it may be narrower than the slot cells' base. The elongated strip can be divided into multiple elongated strips joined either mechanically or via glue bond, and the end clips can be a singular or multiple unit. The elongated strip and the end clips are made out of insulating material, such as grade G-11 glass epoxy laminate.

These and other objects, features, and advantages in accordance with the present invention are provided in particular embodiments by a slot cell retaining apparatus for a rotor generator slot comprising an elongated strip and two or more end clips. The end clips are fastened to either end of the elongated strip and both are made of electrically insulating materials, with the end clips being made of rigid electrically insulating materials. The elongated strip is longer than the rotor generator slot and the elongated strip rests along an inner surface of a slot cell disposed within the rotor generator slot and the end clips clip around each end of the slot cell.

In a related embodiment the elongated strip and/or the end clips are made from grade G-11 glass epoxy laminate. The elongated strip and the end clips may be fastened together by a variety of techniques, but one particular embodiment is to use through pins that maintain a flush surface for the part of the catch that abuts the rotor windings.

Though the catch may be fastened to a variety of surfaces of the slot cell, such as either side or the bottom, the bottom surface is preferred for particular embodiments. Also, a single end clip on either end of the elongated strip is preferred for particular embodiments.

In particular embodiments the end clips are roughly planar, rectangular shaped pieces. This may be varied significantly, such as trapezoidal shaped, where the trapezoid provides a larger potential surface area contact with the rotor body. Further, a U-shaped end clip can cup the sides as well as the bottom of a slot cell insulation.

In yet another embodiment the present invention provides for a generator rotor slot assembly that comprises rotor windings, a slot cell insulation unit and a slot cell catch. The slot cell insulation tends to comprise a single U-shaped piece or two L-shaped halves, although other unit of slot cell insulation may also be used. The slot cell catch is made of insulating materials, such as grade G-11 glass epoxy laminate. The catch itself comprises at least one elongated strip and at least two end clips. At least one end clip is attached to either end of the one or more elongated strips. The slot cell insulation unit is disposed within a rotor slot and the elongated strip is positioned onto at least one surface of the slot cell insulation and the two or more end clips are clipped on at least either end of the slot cell insulation unit outside of the perimeter of the rotor slot, and where the end clips form a flat surface contiguous with the inner surface of the slot cell insulation and raised surface contiguous with the outer surface of the slot cell insulation. The rotor windings are then located within the slot cell insulation unit and atop of the elongated strip. The end clips limit migration of the generator rotor slot assembly by abutting the rotor slot.

BRIEF DESCRIPTION OF THE FIGURES

The invention is explained in more detail by way of example with reference to the following drawings.

DETAILED DESCRIPTION OF THE INVENTION

The present invention provides for a method and apparatus that prevents migration of the slot cells without interfering with the normal function of a generator rotor. Slot cells electrically insulate rotor windings from the rotor body during normal operation of rotor. However, due to relative component displacement resulting from thermal and centrifugal effects the slot cells may axially migrate, which risks exposing the windings to direct contact with the rotor body. If the windings contact the rotor body, a ground will be created which will damage the generator.

The present invention utilizes a slot cell catch (catch) that hold slot cells, both U-shaped and L-shaped, in position within a rotor body slot. The slot cell catch is an elongated strip of material that is placed along the flat length of the slot cell where the windings are to be placed. The elongated strip is slightly longer than the slot cell that it accompanies, and will overlap the slot cell at both ends. The elongated strip then wraps around the ends of the slot cell, either as a contiguous strip or with prosthetic clips at either end. The clips then provide abutments against the rotor body, limiting the migration of the slot cells.

Although amount of migration can be all but eliminated, in most applications the catch allows for a minimal amount of movement of the slot cells. For example, in a typical generator, the allowed movement of the slot cell when employed with the present invention will be from about 0.08–0.16 inches (0.2–0.4 centimeters). This small amount of allowed movement reduces the chances of the slot cell buckling during installation, thermal expansion, hydroscopic expansion, and normal operation of the generator rotor. This allowed movement also prevents breakage of the catch mechanism.

The catch can withstand the forces of rotor in operation, and the limitation in migration reduces the need for inspection on the slot cells as well as lowering the risk of grounds being created between the windings and the rotor body. Reduced migration also lowers the general wear to the slot cells, both from the reduced friction and from sparing the slot cells from being forced back into position.

Figure 1:
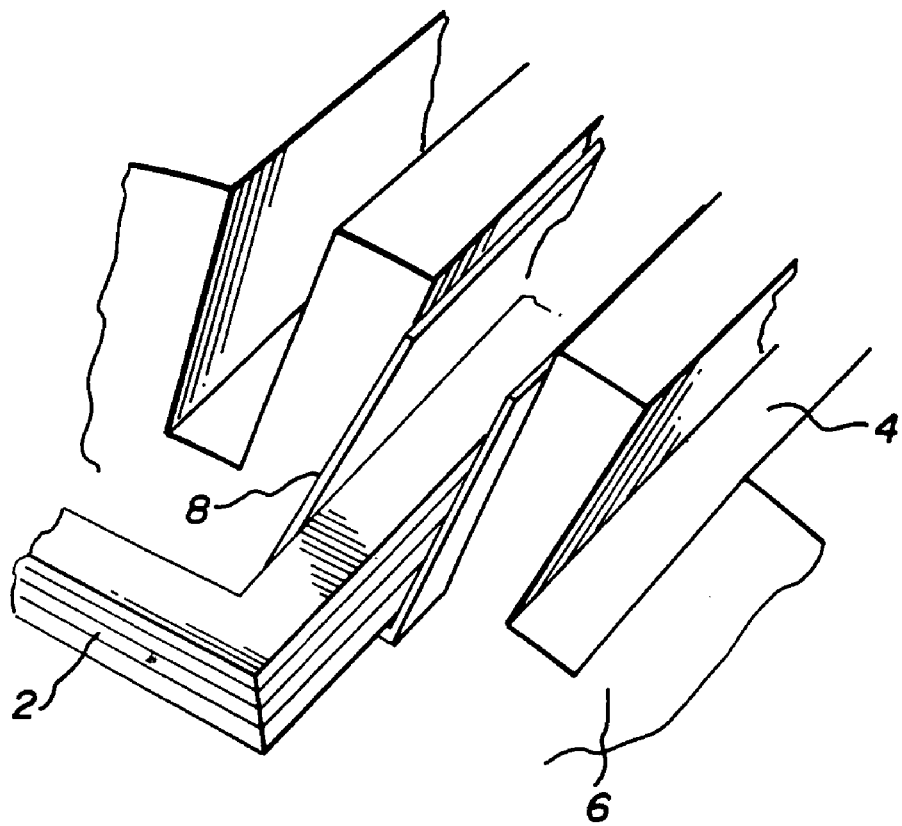
FIG. 1 illustrates how slot cell insulation is used in a rotor generator.
Figure 2:
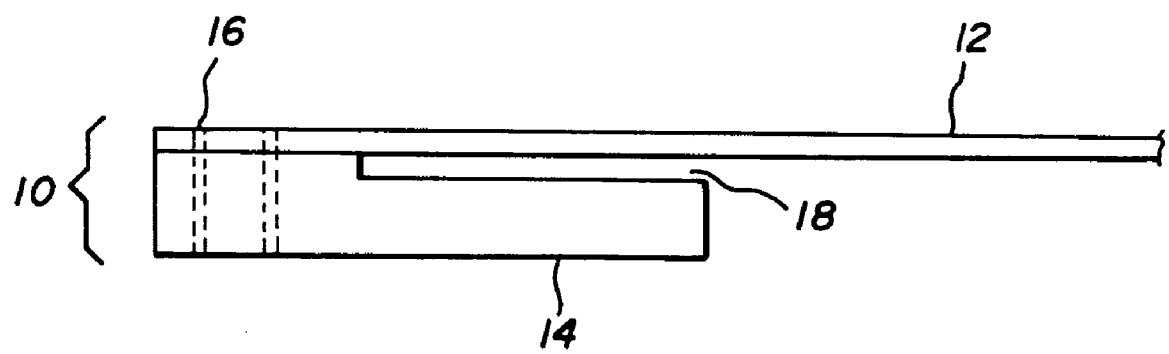
FIG. 2 illustrates a side view of an end portion of a catch according to one embodiment of the present invention.

One embodiment of the present invention is shown in FIG. 2. A side view of the end portion of a catch 10 is illustrated. In this embodiment the catch 10 comprises an elongated strip 12 and two end clips, one of which is shown 14. The end clip 14 can be integral with the elongated strip 12, or it can be attached by a variety of techniques, such as through pins 16. Though the end clip 14 is attached to the elongated strip 12 at an end point, a relatively uniform gap 18 remains between the two pieces for attaching to slot cell insulation.

The size of the gap 18 can vary depending on uses, however, in particular embodiments the gap is minimal, and will create a snug fit with attached slot cells. The snug fig can help support the slot cell and reduce possible buckling. In some embodiments the gap 18 is approximately the thickness of the slot cells which ranges from 0.030 inches to 0.070 inches (about 0.13 cm) wide. The end clip 14 shown in FIG. 2 is of roughly rectangular shape. In other embodiments the end clip is of a variety of shapes, such as rectangular.

The catch 10 may be attached to the slot cell 8 in a variety of different techniques. For example, the elongated strip 12 of the catch is placed over the two portions of an L-shaped slot cell 8. This assembly is then placed within a radial slot 4, and then the end clips 14 of the catch are attached to the elongated strip 12. This techniques reduces the measuring requirements since the end clips 14 can be positioned to the rotor body 6 by hand rather than by precise measurement. Alternatively, L-shaped slot cells can positioned inside assembled elongated strip and end clips outside of the rotor. The entire catch assembly is then placed within a radial slot.

The end clips 14 can also be attached to the elongated strip 12 by a variety of different techniques. In FIG. 2 through-pins 16 are shown as a way of connecting the end clips 14 to the elongated strip 12. Additional techniques, which may be used separately or in conjunction, include but are not limited to screws, glue and bonding, or machined section from continuous piece of laminate. The elongated strip 12 may also be wrapped around the back of the end clip 14 and attached from underneath to provide a stronger hold. In other embodiments the elongated strips and end clips are contiguous.

The elongated strip and the end clips are made out of insulating material, such as grade G-11 glass epoxy laminate. The elongated strip should be rigid with sufficient strength to resist breakage under normal friction forces. The gap 18 prevents the development of forces greater than achievable strength levels. End clips should also be rigid in nature with good compressive strength properties. When slot cell migration occurs, end clip abuts the rotor body, and the rigidity of the end clip prevents further migration.

Figure 3:
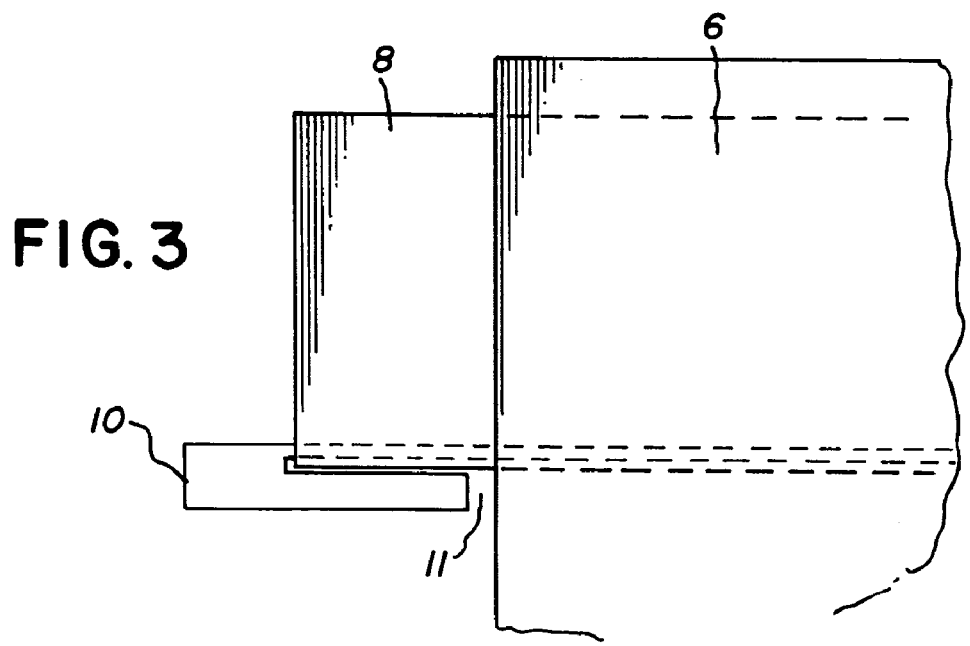
FIG. 3 illustrates a side view of a catch holding slot cell insulation within a rotor generator slot.

FIG. 3 illustrates a side view of a catch 10 holding a slot cell 8 to a rotor body 6. This figure represents a rotor assembly prior to the windings being inserted, and shows only one side of the catch. A similar assembly would be present on the other side of the slot cell. Once the catch 10 is assembled with the slot cell 8 there is a gap 11 between the end clip and the rotor body 6. As the slot cell 8 migrates, the catch 10 abuts the rotor body 6 preventing further movement. In this illustration, the end clip would prevent movement to the right, while a matching end clip on the other side of the catch would prevent migration in the other direction.

Though in the embodiment shown in FIG. 3 the catch is placed on the bottom of the slot cell, this is just a preferred embodiment. It would be equally possible to place catches along the sides of the slot cell, either by themselves or in conjunction with a catch placed along the bottom.

Figure 4:
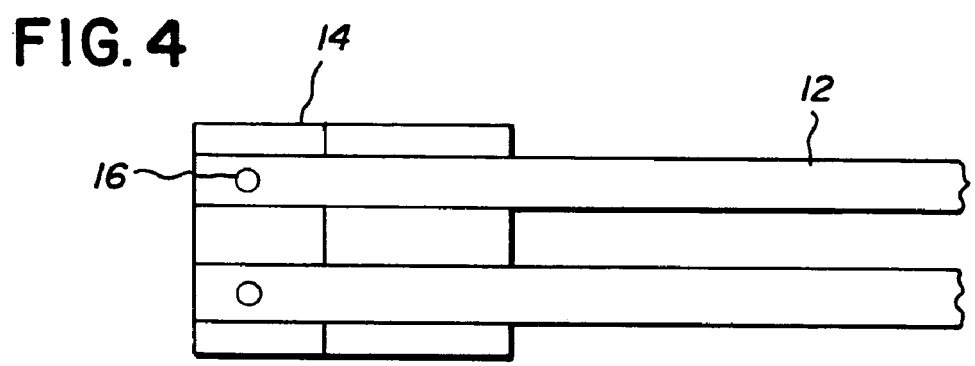
FIG. 4 illustrates a top view of an end portion of a catch according to one embodiment of the present invention.

Referring to FIG. 4, an embodiment with a divided elongated strip 12 is illustrated. This is just one of many embodiments that the elongated strip may take, as will be apparent to one of ordinary skill in the art. In the embodiment shown, the two elongated strips 12 are attached 16 to a single end clip 14. In other embodiments, however, the separate elongated strips may each join their own end clip.

Figure 5:
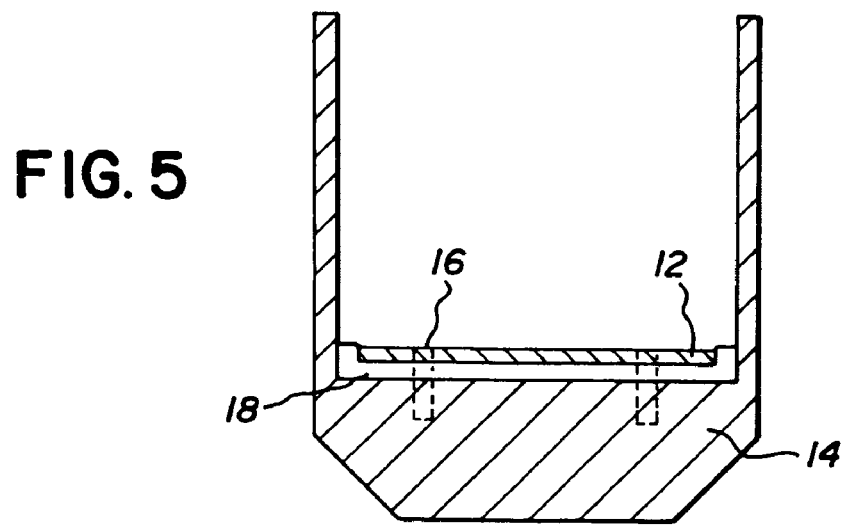
FIG. 5 illustrates an end on view of the inside of an end clip according to a particular embodiment of the present invention.

In the embodiments shown thus far, the end clips are fairly flat and pinch the slot cells only on their base. In other embodiments the end clips have a U-shape that matches the dimensions of the slot cells. In these embodiments the end clips go up the sides of the slot cell insulation. By encasing more of the slot cell, the end clips can better guard against potential buckling. One such embodiment is illustrated in FIG. 5, which is an end-on view of the inside of an end clip 14. Similarly, in some embodiments the elongated strips may contour up the sides of the slot cells.

In one embodiment the present invention provides for a slot cell retaining apparatus for a rotor generator slot comprising an elongated strip and two or more end clips. The end clips are fastened to either end of the elongated strip and both are made of electrically insulating materials, with the end clips being made of rigid electrically insulating materials. The elongated strip is longer than the rotor generator slot and the elongated strip rests along an inner surface of a slot cell disposed within the rotor generator slot and with the end clips clip around each end of the slot cell.

In a related embodiment the elongated strip and/or the end clips are made from grade G-11 glass epoxy laminate. The elongated strip and the end clips may be fastened together by a variety of techniques, but one particular embodiment is to use through pins that maintain a flush surface for the part of the catch that abuts the rotor windings. The tensile strength of the assembly will be dominated by the strength of the glass material which typically is around 20 ksi (flexural strength in direction of laminations).

Though the catch may be fastened to a variety of surfaces of the slot cell, such as either side or the bottom, the bottom surface is preferred for particular embodiments. Also, a single end clip on either end of the elongated strip is preferred for particular embodiments.

In particular embodiments the end clips are roughly planar, rectangular shaped pieces. This may be varied significantly, such as trapezoidal shaped, where the trapezoid provides a larger potential surface area contact with the rotor body. Further, a U-shaped end clip can cup the sides as well as the bottom of a slot cell insulation.

In another embodiment the present invention provides for a slot cell retaining apparatus for a rotor generator slot that comprises an elongated strip and two end clips both made of electrically insulating materials, the end clips being of a more rigid material. The elongated strip is longer than the rotor generator slot and the elongated strip rests along an inner surface of a slot cell disposed within the rotor generator slot. The end clips clip around each end of the slot cell outside of the perimeter of the rotor generator slot. This forms a gap between the two end clips and the perimeter of the rotor generator slot of approximately 0.04–0.08 inches (0.1–0.2 cm).

In yet another embodiment the present invention provides for a generator rotor slot assembly that comprises rotor windings, a slot cell insulation unit and a slot cell catch. The slot cell insulation tends to comprise a single U-shaped piece or two L-shaped halves, although other unit of slot cell insulation may also be used. The slot cell catch is made of insulating materials, such as grade G-11 glass epoxy laminate. The catch itself comprises at least one elongated strip and at least two end clips. At least one end clip is attached to either end of the at least one elongated strip. The slot cell insulation unit is disposed within a rotor slot and the elongated strip is positioned onto at least one surface of the slot cell insulation and the plurality of end clips are clipped on at least either end of the slot cell insulation unit outside of the perimeter of the rotor slot, and where the end clips form a flat surface contiguous with the inner surface of the slot cell insulation and raised surface contiguous with the outer surface of the slot cell insulation. The rotor windings are then located within the slot cell insulation unit and atop of the elongated strip. The end clips limit migration of the generator rotor slot assembly by abutting the perimeter of the rotor slot.

In a particular embodiment the elongated strip or strips are present on a plurality of inner surfaces of the slot cell insulation unit. Either a plurality of strips may be used on multiple inner surfaces, or a single strip can cover more than one inner surface. In a similar fashion the end clips can be present on more than one of the outer surfaces of the slot cell.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A slot cell retaining apparatus for a rotor generator slot comprising:
   an elongated strip, wherein said elongated strip is made of electrically insulating materials; and
   at least two end clips, wherein at least one of said at least two end clips are fastened to either end of said elongated strip and wherein said at least two end clips are made of rigid electrically insulating materials;
   wherein said elongated strip is longer than said rotor generator slot and wherein said elongated strip rests along an inner surface of a slot cell disposed within said rotor generator slot;
   wherein said at least two end clips clip around each end of said slot cell;
   wherein the gap between said at least two end clips and the perimeter of said rotor generator slot is approximately 0.04–0.08 inches (0.1–0.2 cm).

2. The slot cell retaining apparatus of claim 1, wherein said elongated strip is made of grade G-11 glass epoxy laminate.

3. The slot cell retaining apparatus of claim 1, wherein said at least two end dips are made of grade G-11 glass epoxy laminate.

4. The slot cell retaining apparatus of claim 1, wherein said at least two end clips are fastened to said elongated strip with through pins.

5. The slot cell retaining apparatus of claim 1, wherein a single end clip is fastened to each end of said slot cell.

6. The slot cell retaining apparatus of claim 5, wherein said single end clip is fastened to the bottom surface of said slot cell.

7. The slot cell retaining apparatus of claim 5, wherein said single end clips us roughly U-shaped.

8. The slot cell retaining apparatus of claim 1, wherein said at least two end clips are roughly planar.

9. The slot cell retaining apparatus of claim 1, wherein said at least two end clips are roughly trapezoidal.

10. The slot cell retaining apparatus of claim 1, wherein said elongated strip has a. tensile strength of at approximately 20 ksi.

11. A slot cell retaining apparatus for a rotor generator slot comprising:
    an elongated strip, wherein said elongated strip is made of electrically insulating materials; and
    two end clips, wherein one of said end clips is fastened to either end of said elongated strip and wherein said end clips are made of rigid electrically insulating materials;
    wherein said elongated strip is longer than said rotor generator slot and wherein said elongated strip rests along an inner surface of a slot cell disposed within said rotor generator slot;
    wherein said at least two end clips clip around each end of said slot cell outside of the perimeter of said rotor generator slot;

wherein the gap between said two end clips and the perimeter of said rotor generator slot is approximately 0.04–0.08 inches (0.1–0.2 cm).

12. The apparatus of claim 11, wherein said slot cell retaining apparatus is made of grade G-11 glass epoxy laminate.

13. A generator rotor slot assembly comprising
   rotor windings;
   a slot cell insulation unit; and
   a slot cell catch made of insulating materials, wherein said slot cell catch comprises:
      at least one elongated strip;
      at least two end clips, wherein at least one end clip is attached to either end of said at least one elongated strip;
   wherein said slot cell insulation unit is disposed within a rotor slot and said elongated strip is positioned onto at least one surface of said slot veil insulation and said at least two end clips are clipped on at least either end of said slot cell insulation unit outside of the perimeter of said rotor slot;
   wherein said at Least two end clips form a flat surface contiguous with the inner surface of said slot cell insulation and raised surface contiguous with the outer surface of said slot cell insulation;
   wherein said rotor windings are located within said plot cell insulation unit and atop of said elongated strip;
   wherein the gap between said at least two end clips and the perimeter of said rotor generator slot is approximately 0.04–0.08 inches (0.1–0.2 cm).

14. The apparatus of claim 13, wherein said at least two end clips are roughly trapezoidal.

15. The apparatus of claim 13, wherein said at least two end clips are roughly planar.

16. The apparatus of claim 13, wherein said at least two end clips are attached to said at least one elongated strip by a plurality of through pins.

17. The apparatus of claim 13, wherein said at least one elongated strip is present on a plurality of inner surfaces of said slot cell insulation unit.

18. The apparatus of claim 13, wherein said at least two end clips form the raised surface contiguous with the outer surface of said slot cell insulation on a plurality of the outer surfaces.

19. The apparatus of claim 13, wherein said slot cell insulation unit comprises two L-shaped halves.

* * * * *